April 14, 1936.  G. D. KRATZ  2,037,031
MACHINE FOR MAKING RUBBER THREADS AND METHOD OF MAKING THE SAME
Filed April 4, 1934  4 Sheets-Sheet 1

INVENTOR
George D. Kratz
BY Mock & Blum
ATTORNEYS

April 14, 1936.  G. D. KRATZ  2,037,031
MACHINE FOR MAKING RUBBER THREADS AND METHOD OF MAKING THE SAME
Filed April 4, 1934    4 Sheets-Sheet 2

INVENTOR
George D. Kratz
BY
ATTORNEYS

April 14, 1936.  G. D. KRATZ  2,037,031
MACHINE FOR MAKING RUBBER THREADS AND METHOD OF MAKING THE SAME
Filed April 4, 1934   4 Sheets-Sheet 3
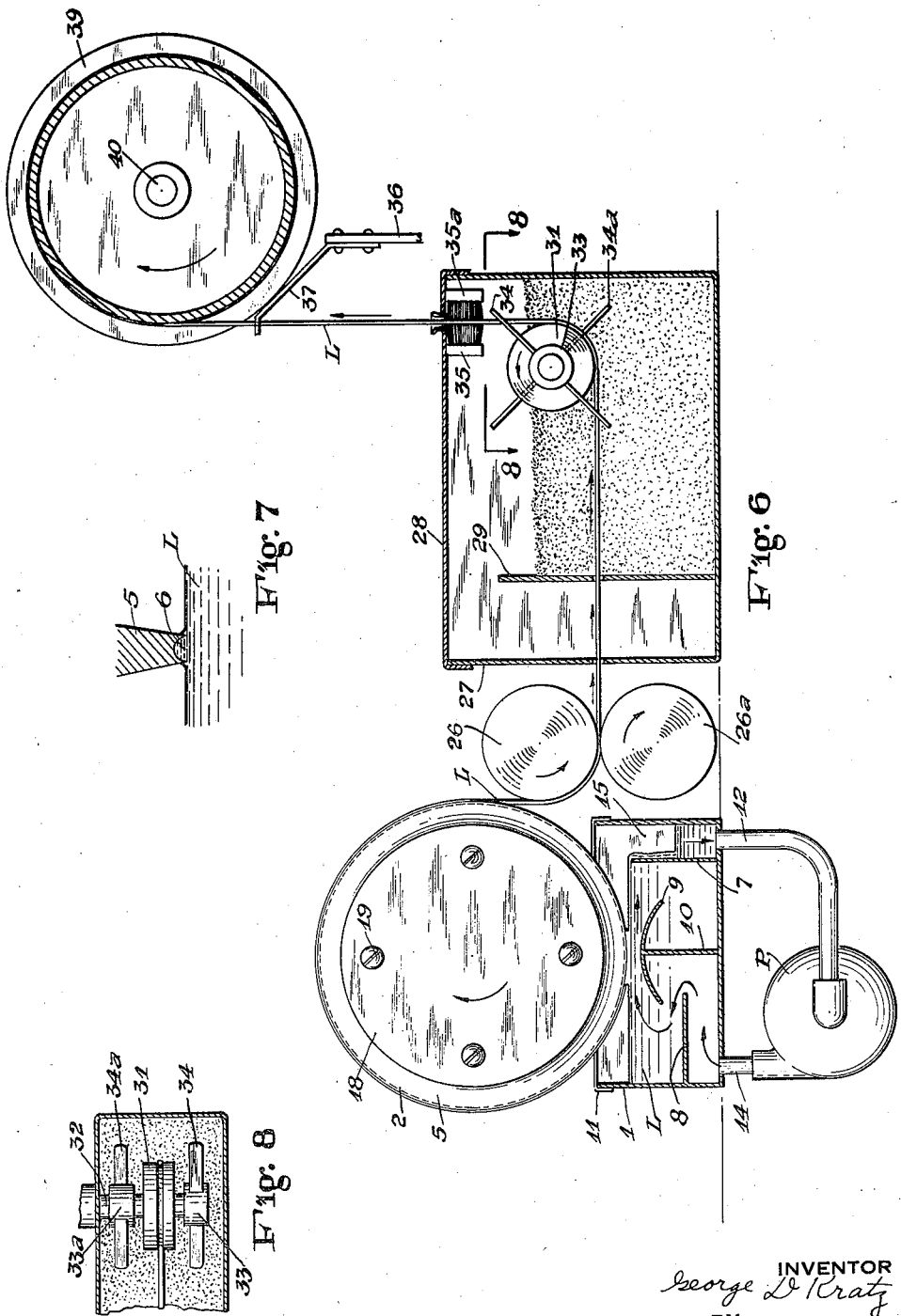
INVENTOR
George D. Kratz
BY
ATTORNEYS April 14, 1936.  G. D. KRATZ  2,037,031
MACHINE FOR MAKING RUBBER THREADS AND METHOD OF MAKING THE SAME
Filed April 4, 1934  4 Sheets-Sheet 4
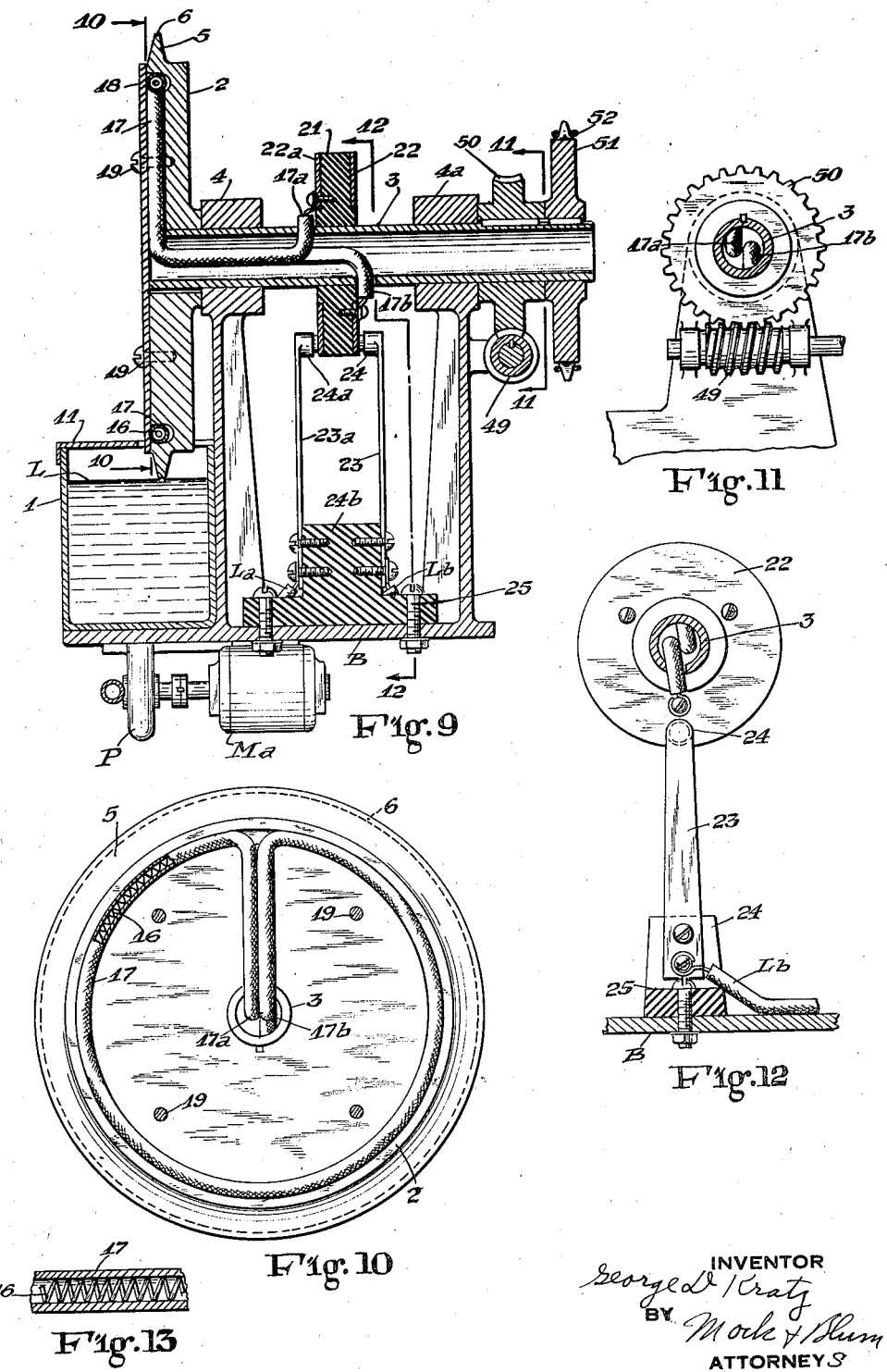
INVENTOR
George D. Kratz
BY
Mock & Blum
ATTORNEYS Patented Apr. 14, 1936

2,037,031

UNITED STATES PATENT OFFICE 2,037,031

MACHINE FOR MAKING RUBBER THREADS AND METHOD OF MAKING THE SAME

George D. Kratz, Scarsdale, N. Y., assignor, by mesne assignments, to Caoutchouc Laboratories, Inc., a corporation of New York Application April 4, 1934, Serial No. 718,954

8 Claims. (Cl. 18—8)

My invention relates to a new and improved machine for making elastic threads from latex and/or similar material, and to a new and improved method of making the same.

One of the objects of my invention is to provide a machine and method whereby latex is coagulated by a drying operation, the latex being simultaneously formed into threads of any desired shape and cross section.

Another object of my invention is to provide a method of, and a mechanism for, producing elastic rubber thread, which shall be simple and convenient and cheap to operate.

Another object of my invention is to provide a mechanism and method whereby the thread can be readily formed in large scale production and said thread will be of substantially uniform quality and shape and cross section.

Other objects of my invention will be set forth in the following description and drawings which illustrate a preferred embodiment thereof, it being understood that the above statements of the objects of my invention are intended to generally explain the same without limiting it in any manner.

Figures 3, 4, 5:
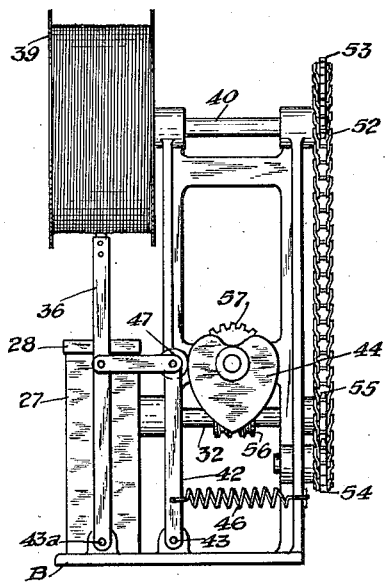
Fig. 3 is an end view at the right-hand side of Fig. 1.
Fig. 4 is a side elevation, showing the side of the machine which is opposite to the side which is illustrated in Fig. 1.

Fg. 5 is a section on the line 5—5 of Fig. 4.

Figure 2:
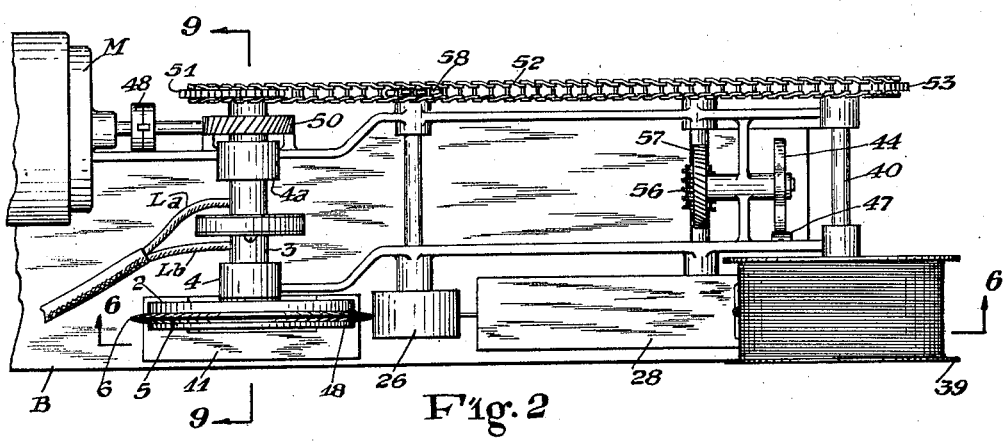
Fig. 2 is a top plan view.

Fig. 6 is a sectional view on the line 6—6 of Fig. 2.

Fig. 7 is an enlarged detail view showing the device for picking up the latex from a pool or body of said latex.

Fig. 8 is a sectional view on the line 8—8 of Fig. 6.

Fig. 9 is a sectional view on the line 9—9 of Fig. 2.

Fig. 10 is a sectional view on the line 10—10 of Fig. 9.

Fig. 11 is a sectional view on the line 11—11 of Fig. 9.

Fig. 12 is a sectional view on the line 12—12 of Fig. 9.

Fig. 13 is an enlarged detail view, partially in section, showing the electric heating element.

Figure 1:
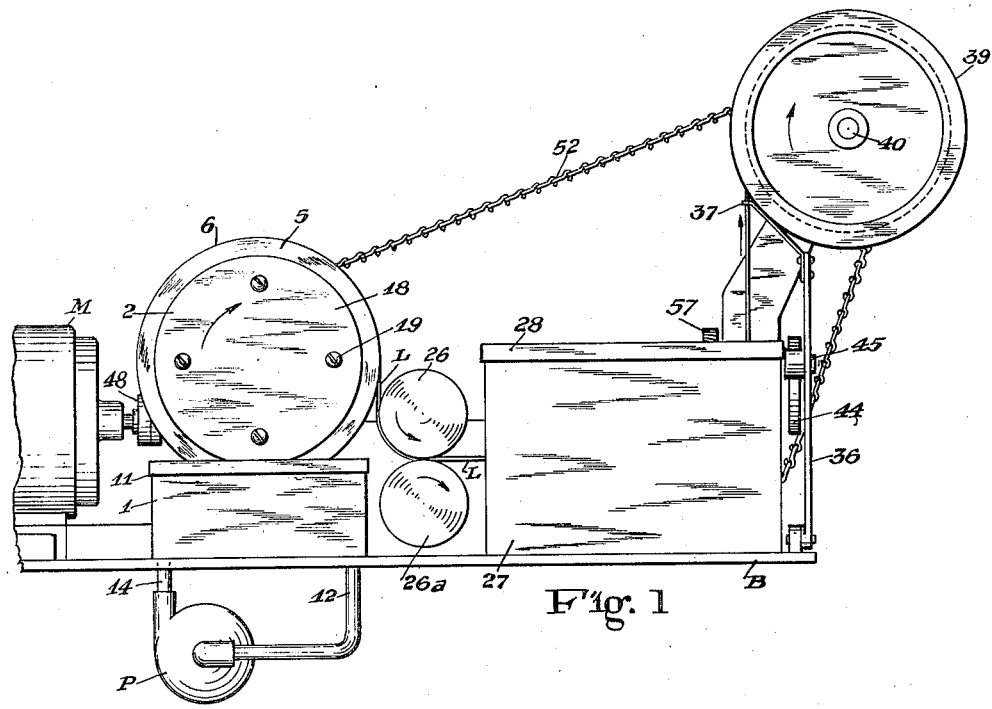
Fig. 1 is a side elevation of a machine which can be used for carrying out my improved method.

Referring to Fig. 1, the latex or similar material is located within a tank or container 1 of any suitable type.

A roller 2 is mounted upon a hollow shaft 3, which is mounted in bearings 4 and 4a, which are suitably secured to the base B of the machine. In this embodiment the bearings are integral with said base B, so as to form a general frame for the machine.

Referring to Fig. 9, the roller 2 is provided with an enlargement 5, whose periphery is formed with a groove 6.

Referring to Fig. 7, the grooved portion of the roller 2 dips into the latex L only so far that the edges of the groove contact the latex so that an annulus of latex is picked up in said groove 6. The roller 2 may be made of any suitable metal such as "Monel" metal or stainless steel, which is not attacked by the ammonia or other ingredients which are present in commercial latex.

Since the roller 2 is made of material which has high heat conductivity, said roller can be uniformly and readily heated by means of electrical heating means which will be later more fully described.

Referring to Fig. 6, means are provided for maintaining the latex L at a constant level. As shown in Fig. 6, the tank 1 is provided with a vertical baffle 7, thus forming a sub-compartment within the tank 1. This sub-compartment is provided with a horizontal baffle 8 and with a curved baffle 9 which is mounted upon a support 10 which may be integral with or suitably connected to the bottom of said tank 1. The tank 1 is provided with a cover 11 and said cover 11 has an opening through which the grooved portion 5 of the roller 2 projects.

A pump P is provided with an inlet 12 and an outlet 14.

The latex is continuously circulated by means of this pump and it moves through the sub-compartment which has been previously mentioned, in the direction of the arrows which are indicated in Fig. 6, so that the top portion of the latex moves in a direction opposite to the direction of movement of the adjacent part of the member 5. However, and if desired, the latex which is picked up by the groove 6, could be caused to move in the same direction as the direction of movement of the adjacent part of the member 5.

Likewise the latex could be caused to flow through a suitable trough-shaped member, and the pick-up member 5 could be caused to contact with the flowing latex, which will have a constant level in said trough-shaped member.

If desired, any suitable large tank of latex could be connected to the pump P in order to compensate for the removal of the latex from the tank 1.

The baffle 7 serves as an overflow member, so that the excess of latex falls into the space 15.

The drum or roller 2 is heated by means of an electric resistance coil 16, which is located within a suitable sleeve 17 made of insulating material. The electric heating member may be flexible and of any suitable type.

As shown in Fig. 9, the electric resistance coil is located within a suitable groove which is provided in a face of the roller 2. The roller 2 is provided with a cover 18 which is connected to said roller 2 by means of screws or other fastening members 19, thus holding the heating member in position.

The ends 17a and 17b of the heating member pass into the hollow shaft 3, and out of said hollow shaft at separated points, as shown in Fig. 9. The ends of the heating coil 16 are connected to a commutator having a base 21 which is made of Bakelite or other suitable insulating material and said commutator is provided with suitable annular metal plates 22 and 22a, which are of the usual type. The electric heating coil can be heated either by direct current or alternating current. It will be noted that the latex is collected upon the body 2, by means of the surface tension of the latex. Likewise, and as an additional improvement, the latex collecting body 2 is directly heated so that the portion of said body 2 which dips into the pool of latex (said pool being stationary or non-stationary) is sufficiently heated in order to collect a latex layer which is of substantial thickness, as compared with the extremely thin film which can be collected upon a collecting body having a low temperature.

I prefer to collect the latex upon the heated collecting body solely by the adhesion or surface tension of the latex, and as distinguished from prior methods or devices in which the latex was collected by suction upon a porous body.

As shown in Fig. 6, the pool or body of latex has a cross-section which is greater in area than the cross-section of the layer of latex which is collected upon the heated collecting member 2. Hence the heat of member 2 serves to collect a layer of latex thereon, without excessively heating the remaining latex of said body.

The line wires Lb and La are connected to springs 23 and 23a, which are connected to a supporting member 24b, which is made of Bakelite or other suitable insulating material. Said support 24b is connected to the base B of the device, by means of fastening devices 25.

The springs 23 and 23a have heads 24 and 24a, which press against the metal plates 22 and 22a, so that current is constantly supplied to the heating coil, as the hollow shaft 3 is turned.

Referring to Fig. 6, the latex adheres to the surface of the groove 6, and the latex is carried up and away from the container 1, while said latex is dried and coagulated by means of the heat which is supplied to the roller 2.

The thin mass of latex is completely coagulated after it has passed through an arc of about 270°. The completely coagulated latex is now stripped from the member 5 and it is caused to pass between a pair of rolls 26 and 26a, one of which is positively driven. If desired, both of said rolls 26 and 26a could be positively driven so that they turn at the same speed in unison.

The rollers 26 and 26a are preferably provided with cylindrical surfaces. The latex L in the tank 1 may have intermixed therewith any suitable vulcanizing material, and any suitable accelerator or accelerators so that the latex may be vulcanized when it has moved to the point marked "L" in Fig. 6, thus making it easy to remove the vulcanized strip of latex from the groove 6.

In starting the machine, the parts can be slowly moved as by hand or otherwise, and the end of the coherent latex thread can be inserted between the rolls 26 and 26a and the process is thereafter continuous.

The rolls 26 and 26a can be pressed against each other by any suitable means and this pressure may be regulated as it is preferably very light, just sufficient to cause the positive feed of the coherent latex in the direction of the arrows which are shown in Fig. 6.

As later described herein, a positive pulling action is exerted upon the strip of coherent latex by other means. The rolls 26 and 26a produce enough tension to positively and uniformly strip the vulcanized latex from the roller 2, as there is slight adhesion between the vulcanized latex and the roller 2.

The coagulated or vulcanized latex now passes through a body of dusting powder which may be talc or mica or powder of any other suitable type. This dusting powder is located within a tank 27 which has a cover 28. The tank 27 is provided with a partition 29 which forms a sub-compartment in said tank 27. This partition 29 is provided with an opening through which the strip of vulcanized latex passes.

A grooved guide roll 31 is mounted upon a shaft 32 which is located within said sub-compartment. Said shaft 32 is provided with agitators 33 and 33a, which are provided with blades 34 and 34a.

These agitators maintain the dusting powder in loose and agitated condition so that the vulcanized latex is effectively coated with the dusting powder. If desired, surplus powder can be removed from the strip of latex by means of brushes 35 and 35a, although said brushes may be omitted. Said brushes 35 and 35a may be pressed against the strip of latex by any suitable means, such as springs or the like.

The strip of vulcanized latex then passes through a hole in a guide member 37, which is connected to a movable member 36.

The strip of vulcanized latex is now wound in either helical or spiral form, upon a magazine spool 39, which is mounted upon a shaft 40. The vulcanized latex is wound upon said spool 39, and the drive of the spool 39 is regulated so that the rate of winding is substantially the same as the rate of feed to said magazine spool.

It is preferred to wind the latex upon the magazine spool 39, in a plurality of superposed helical layers, in the same manner that cotton thread is wound upon a spool.

Referring to Fig. 5, the member 36 is pivoted at 43a to the base of the machine. A link 41 is pivotally connected to the member 36 and to an arm 42 which is pivotally mounted at 43 on the base of the machine. A cam 44, mounted upon a shaft 45, causes the members 42 and 36 to rock back and forth in unison.

Fig. 5 shows the median position of the member 36 in full lines and it shows the extreme left-hand and right-hand positions of said member 36, in dotted lines.

A suitable spring 46 maintains the roller 47 of the member 42, against the cam 44. The cam 44 is shaped so that there is a short period of dwell of the member 36 at its left-hand position and at its right-hand position. Any suitable type of winding apparatus can be utilized.

Referring to Fig. 4, the machine is driven by means of a motor M whose shaft is provided with a suitable clutch or coupling 48. This clutch or coupling 48 operates a shaft upon which a worm 49 is mounted as shown in Fig. 11. This worm 49 operates a worm wheel 50 which is keyed to the hollow shaft 3.

As shown in Fig. 9, the hollow shaft 3 is also provided with a sprocket 51. A drive chain 52 passes around said sprocket 51 and said drive chain 52 passes partially around a sprocket 53 which is mounted upon the shaft 40. The drive chain 52 also passes partially around an idler sprocket 54, and said drive chain 52 also passes partially around a sprocket 55 which is mounted upon the shaft 32, for actuating the guide roller 31 and the agitators 33 and 33a.

Referring to Fig. 3, the shaft 32 is provided with a worm 56, which operates a worm wheel 57, which is mounted upon the shaft 45. This provides for the relative slow drive of the cam 44.

The drive chain 52 also passes partially around a sprocket 58, which is mounted upon the shaft of the upper roll 26, which frictionally drives the lower roll 26a.

Referring to Fig. 9, the pump P is driven by means of any suitable motor M$^a$.

In order to completely coagulate the latex or to vulcanize the same, the latex may be heated to a temperature of about 200° F. before it reaches the point L which is shown in Fig. 6. This temperature is given only as an example, as it depends upon the composition of the latex material which is taken up into the groove. The latex in the tank 1 can have any suitable materials added thereto, such as colloidal zinc oxide, which can be intimately intermixed with the latex. Other reinforcing and thickening agents can be added to the latex, in colloidal form or in any suitable condition.

By suitably shaping the cross section of the groove, the strip may be given any desired cross section, because the cross section thereof remains substantially unchanged after the strip passes beyond the point L of Fig. 6, since the latex has been vulcanized or rendered completely coherent prior to passing between the rolls 26 and 26a. If a flat strip is produced, this strip can be twisted about its axis while the strip is held straight, so as to produce a substantially cylindrical thread having any desired number of turns per inch.

The threads produced by this invention may be covered with one or more helically wound layers of silk, cotton or other textile yarn in order to form a composite elastic thread which can be used for many purposes, such as weaving, knitting and the like. Garments and wearing apparel of any type may be woven or knitted, either wholly or in part, from the composite elastic thread.

Whenever I refer to latex either in the description or in the claims, it is to be understood that I wish to cover the use of equivalent materials, such as artificial rubber dispersions, the use of rubber substitutes in liquid or viscous form and the like. Likewise I do not wish to exclude from the scope of the invention, the use of rubber solutions which are produced by treating rubber with benzine or naphtha or other solvent materials.

It will be noted that instead of extruding the latex through a nozzle or nozzles, in order to form threads, which are coagulated subsequent to extrusion, I pick up the latex by means of its adhesion to a heated movable member of suitable material and that I coagulate said latex before stripping it from said movable member.

Experience has shown that it is very difficult to secure a uniform product if the latex is extruded through a narrow nozzle and the latex is then coagulated by heat or chemicals at the outlet of the extrusion nozzle, if it is desired to operate the process continuously. Under said circumstances the feed of the latex is not uniform and a thread of varying thickness is secured.

Hence, while I do not wish to exclude the extrusion of the latex through a narrow nozzle or the like, I prefer to pick up the latex, by means of adhesion upon a heated movable member, and coagulate the latex into coherent form, before the latex is separated from said movable member. However, it may be noted that the latex is not fully coagulated into coherent form, or into the vulcanized condition until the picked-up thread of latex has been moved a substantial distance away from the pool of latex.

After the latex has been moved about 120° on the drum 2, it is sufficiently coherent, so that it can be handled, although additional heat treatment is required to completely set the latex in final coherent form. The drum 2 may have a diameter of about 4½ inches, and it turns at about four revolutions per minute. The drum may be made larger in order to secure a higher peripheral speed.

Likewise I prefer to completely coagulate and/or vulcanize the latex before it is separated from the first movable member (namely, the roller 2). However, the invention is not necessarily limited to this complete coagulation or vulcanization, as I wish to cover the idea of merely coagulating or vulcanizing latex to a certain degree, sufficient to secure a coherent form, before it is separated from said roller 2.

Another advantage of heating the latex while the same is located in an open groove, is that the water in the latex can be readily evaporated. For this purpose it is advantageous to produce a very thin ribbon of latex, as the flat ribbon can afterwards be twisted in order to produce a rubber thread which can afterwards be covered with one or more helical windings of cotton yarn or the like, so that the composite thread will correspond to a composite thread whose rubber core has a circular cross section.

The thickness of the rubber ribbon which is produced may be as low as 0.008 inch, and it may have a width of about 0.012 inch. Tests have shown that if an unheated collecting member is used, the thickness of the film which is collected does not exceed about 0.002 inch. I prefer to collect the latex by means of the adhesion or surface tension of the latex, as distinguished from prior methods or devices in which the latex was collected by suction upon a porous body.

As shown in Fig. 6, the pool or body of latex has a width which exceeds the width of the groove. Likewise, the groove has sharp edges. By using a suitable temperature, and as shown in Fig. 6, the latex is collected substantially in the groove. The thread can be made even thinner than 0.008 inch.

While I have shown a complete machine, it is obvious that many of the details and parts thereof could be omitted without departing from the spirit of the invention, and that the specification shows numerous valuable sub-combinations which are to be protected, independently of the complete machine and/or method specified herein.

Any suitable doctor blade or blades can be provided for removing the latex from the member 5, save for the grooved portion of said member 5.

However, and in actual practice, such blade or blades are not necessary because the latex is lifted into the groove 6 by capillary action, and it does not adhere to any other part of the periphery of member 5. It will be noted that the groove 6 has a concave cross-section, and Fig. 7 is substantially drawn to scale.

If desired, the pump P and the accessory parts can be entirely omitted so that the pool of latex is maintained substantially stationary while it is being picked up by the roller 2. Likewise, while I prefer to use a roller, I may use any other suitable member or support having a groove in which a thread of latex is formed.

I claim:

1. A method of forming a rubber thread, which consists in causing a heated member which has a groove to contact a body of latex whose width exceeds the width of said groove, continuously collecting the latex in said groove substantially solely by means of the surface tension of the latex, moving said heated member relative to said body at sufficiently low speed to take up latex in the groove, and forming in said groove a dried and coherent rubber thread.

2. A method of forming a rubber thread, which consists in causing a heated and grooved member to move in a closed path, supplying latex to the groove of said heated member at a lower part of said path, collecting the latex in said groove substantially solely by the surface tension of the latex, and drying the latex which is picked up in said groove while the latex is being moved upwardly away from the point at which the latex is taken up into said groove.

3. A method of forming a rubber thread which consists in causing a heated and grooved body to move relative to a horizontally moving pool of latex which is located below said grooved body, causing the groove of said body to pick up latex from said moving pool substantially solely by the surface tension of the latex, the depth of said pool being sufficient to cause the picked-up latex to contact with substantially the entire wall of said groove, maintaining the latex in the groove of said heated body until the latex has become coherent, and stripping the latex from said groove after the latex has become coherent.

4. A method of forming a rubber thread which consists in causing a heated and grooved body to move relative to a pool of latex which is located below said grooved body and which moves horizontally and in a direction countercurrent to that of said grooved body, causing the groove of said body to pick up latex from said moving pool substantially solely by the surface tension of the latex, the depth of said pool being sufficient to cause the picked-up latex to contact with substantially the entire wall of said groove, maintaining the latex in the groove of said heated body until the latex has become coherent and stripping the latex from said groove after the latex has become coherent.

5. An apparatus for the continuous production of elastic threads from rubber latex and the like comprising, in combination, a heated, non-porous, grooved member, means adapted to maintain a pool of latex below said member, means adapted to maintain the level of the latex just in contact with said grooved member, means to move the grooved member into contact with the surface of the latex so that the latex is continuously collected in the groove only and substantially solely by means of the surface tension of the latex, and means for stripping the coagulated latex from the groove in the form of a coherent thread.

6. An apparatus for the continuous production of elastic threads from rubber latex and the like comprising, in combination, a heated, grooved, non-porous member, means adapted to maintain a pool of latex below said member, means adapted to maintain the level of the latex just in contact with the edges of said groove, means to move the grooved member through a closed path in a vertical plane into contact with the surface of latex so that the latex is continuously collected in the groove and substantially solely by means of the surface tension of the latex, and means for stripping the coagulated latex from the groove in the form of a coherent thread.

7. An apparatus for the continuous production of elastic threads from rubber latex and the like comprising, in combination, an internally heated, non-porous roller having a grooved periphery, means adapted to maintain a pool of latex below said roller at such a level that substantially only the edges of the groove are in contact with the surface of the latex, means to move the grooved roller into said contact with the surface of latex so that the latex is continuously collected in the groove and substantially solely by means of the surface tension of the latex, and means for stripping the coagulated latex from the groove in the form of a coherent thread.

8. An apparatus for the continuous production of elastic threads from rubber latex and the like comprising, in combination, a heated, grooved member, means adapted to maintain a pool of latex below said member, means for circulating the latex in a direction countercurrent to the direction of movement of the grooved member, means to move the grooved member through a closed path in a vertical plane into contact with the surface of the latex so that the latex is continuously collected in the groove by means of the surface tension of the latex, and means for stripping the coagulated latex from the groove in the form of a coherent thread.

GEORGE D. KRATZ.